(12) United States Patent
El-Saban et al.

(10) Patent No.: US 8,605,783 B2
(45) Date of Patent: Dec. 10, 2013

(54) COMPOSITE VIDEO GENERATION

(75) Inventors: Motaz Ahmed El-Saban, Cairo (EG);
Ayman Malek Kaheel, Cairo (EG);
Mahmoud Ahmed Refaat, Cairo (EG);
Ahmend Mohamed Abdul Hamid,
Cairo (EG)

(73) Assignee: Microsoft Corporation, Redmond, WA (US)

( * ) Notice: Subject to any disclaimer, the term of this patent is extended or adjusted under 35 U.S.C. 154(b) by 316 days.

(21) Appl. No.: 12/471,118

(22) Filed: May 22, 2009

(65) Prior Publication Data

US 2010/0296571 A1 Nov. 25, 2010

(51) Int. Cl.
*H04N 11/02* (2006.01)

(52) U.S. Cl.
USPC ...................................... 375/240.1

(58) Field of Classification Search
USPC ........... 375/240.1; 348/564, 512, 36; 382/284
See application file for complete search history.

(56) References Cited

U.S. PATENT DOCUMENTS

| 6,075,905 | A * | 6/2000 | Herman et al. ............ 382/284 |
| 7,460,730 | B2 | 12/2008 | Pal et al. |
| 2007/0030391 | A1* | 2/2007 | Kim et al. ................. 348/564 |
| 2008/0005767 | A1* | 1/2008 | Seo ............................ 725/62 |
| 2008/0081643 | A1* | 4/2008 | Nagata et al. ............ 455/456.6 |
| 2008/0143875 | A1* | 6/2008 | Scott et al. ................. 348/512 |
| 2008/0170803 | A1 | 7/2008 | Forutanpour |
| 2008/0253685 | A1 | 10/2008 | Kuranov et al. |
| 2009/0022422 | A1 | 1/2009 | Sorek et al. |
| 2009/0058988 | A1 | 3/2009 | Strzempko et al. |
| 2009/0122675 | A1* | 5/2009 | Van Endert et al. ......... 369/53.2 |
| 2011/0258287 | A1* | 10/2011 | Anderson .................... 709/217 |

FOREIGN PATENT DOCUMENTS

WO   WO2009020381 (A1)   2/2009

OTHER PUBLICATIONS

Szeliski, "Image Alignment and Stitching: A Tutorial", MSR Tech Report (last updated 2006). Retrieved Aug. 16, 2011 from http://pages.cs.wisc.edu/~dyer/ai-qual/szeliski-tr06.pdf.*

Haenselmann, et al., "Multicamera Video-Stitching", retrieved on Mar. 16, 2009 at <<http://www.informatik.uni-mannheim.de/pi4/publications/Haenselmann2006a.pdf>>, University of Mannheim, Applied Computer Science IV, Germany, 8 pages.

(Continued)

*Primary Examiner* — David Czekaj
*Assistant Examiner* — Leron Beck
(74) *Attorney, Agent, or Firm* — Zete Law, P.L.L.C.; MacLane C. Key

(57) ABSTRACT

Composite video generation is described. In an embodiment, mobile video capture devices, such as mobile telephones, capture video streams of a common event. A network node receives the video streams and time-synchronizes them. Frames from each of the video streams are then stitched together to form a composite frame, and these are added to a composite video sequence. In embodiments, the composite video sequence is encoded and streamed to a user terminal over a communications network. In embodiments, the common event is a live event and the composite video sequence is generated in real-time. In some embodiments, the stitching of the video streams is performed by geometrically aligning the frames. In some embodiments, three or more mobile video capture devices provide video streams.

20 Claims, 7 Drawing Sheets

(56) References Cited

OTHER PUBLICATIONS

Pirillo, "Real-Time Stitching of Mobile Videos", retrieved on Mar. 17, 2009 at <<http://chris.pirillo.com/real-time-stitching-of-mobile-videos/>>, Feb. 28, 2009, 2 pages.

Shimizu, et al., "A fast video stitching method for motion-compensated frames in compressed video streams", International Conference on Consumer Electronics, Jan. 2006, Consumer Electronics, 2006, Digest of Technical Papers.

Szeliski, "Image Alignment and Stitching: A Tutorial", MST Tech Report (last updated 2006), retrieved on May 21, 2009 at <<http://www.caam.rice.edu/~zhang/caam699/p-files/Im-Align2005.pdf>>.

Uyttendaele, et al., Microsoft Research "Eliminating ghosting and exposure artifacts in image mosaics", IEEE Computer Society Conference on Computer Vision and Pattern Recognition (CVPR'2001), retrieved on May 21, 2009 at <<http://research.microsoft.com/pubs/75702/Uyttendaele-CVPR01.pdf>>.

* cited by examiner

COMPOSITE VIDEO GENERATION

BACKGROUND

Video sharing web services enable end users to upload videos captured using their mobile telephones or other devices to a web site. The videos can then be viewed by others who access the web site. An end user is able to specify whether his or her video is to be publicly available to all visitors to the web site or whether it is to be shared only by a specified group of individuals.

Such video sharing web services are used for many purposes such as sharing videos of family events between family members who live in different countries. Other examples include sharing videos of educational lectures or entertainment performances. Typically video is captured on a mobile telephone and at a later time is uploaded to the web service. Others are then able to download the video from the web service.

Typically the videos recorded by mobile telephones have low resolution. This results in the videos having a small field of view for an acceptable quality. In addition, the low processing power and small image sensors available on mobile telephones limits the quality of the videos captured.

The embodiments described below are not limited to implementations which solve any or all of the disadvantages of known video sharing systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Composite video generation is described. In an embodiment, mobile video capture devices, such as mobile telephones, capture video streams of a common event. A network node receives the video streams and time-synchronizes them. Frames from each of the video streams are then stitched together to form a composite frame, and these are added to a composite video sequence. In embodiments, the composite video sequence is encoded and streamed to a user terminal over a communications network. In embodiments, the common event is a live event and the composite video sequence is generated in real-time. In some embodiments, the stitching of the video streams is performed by geometrically aligning the frames. In some embodiments, three or more mobile video capture devices provide video streams.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a video sharing system, the system described is provided as an example and not a limitation. As those skilled in the art will appreciate, the present examples are suitable for application in a variety of different types of video systems.

Figure 1:
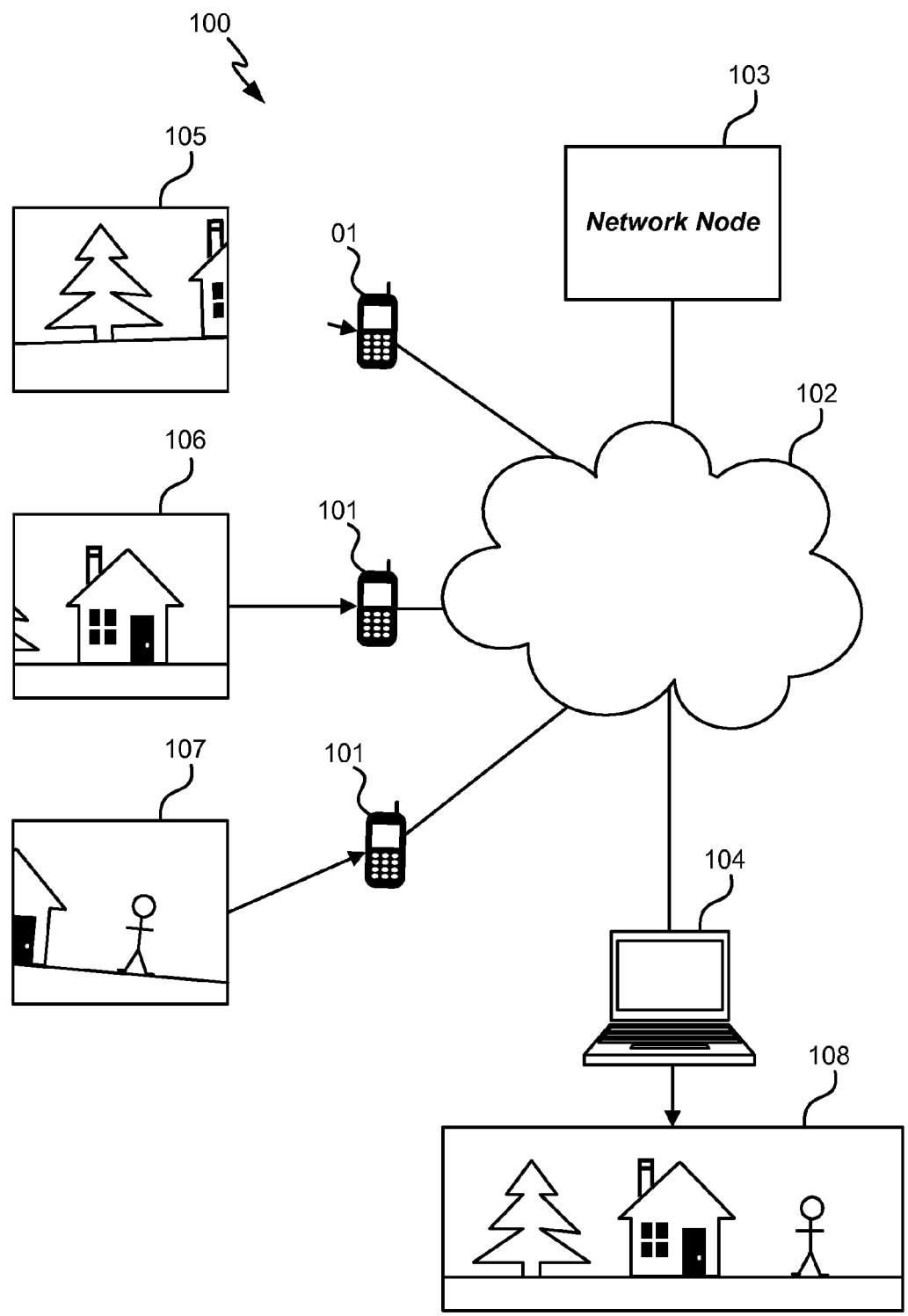
FIG. 1 shows a video sharing system comprising composite video generation.

Reference is first made to FIG. 1, which illustrates a video sharing system 100 comprising composite video generation. The system 100 comprises a plurality of mobile video capture devices 101 connected to a communication network 102 (three mobile video capture devices 101 are shown in FIG. 1, but many more can be present). The mobile video capture devices 101 can be mobile telephones comprising image sensors capable of capturing video images. The communication network 102 is of any suitable type for communicating video streams between entities, such as the Internet, a cellular network, the public switched telephone network (PSTN), a local area network (LAN), or a combination of the above. Preferably, the mobile video capture devices 101 communicate wirelessly with the communication network 102.

In an alternative example, the mobile video capture devices 101 can comprise a camcorder or digital camera connected to a mobile telephone, such as via a short range wireless link (e.g. Bluetooth). Alternatively, the mobile video capture devices 101 can be in the form of a camcorder or digital camera having data transmission capabilities, such as a WiFi transceiver. Alternatively, the mobile video capture devices 101 can be in the form of a portable computer having video capture capabilities.

The mobile video capture devices 101 are able to transmit video streams over the communication network 102 to a network node 103 connected to the communication network 102. The network node 103 is a server arranged to receive the video streams from each of the mobile video capture devices 101, and generate a composite video stream in real-time. The structure and operation of the network node 103 is described in more detail hereinafter. Note that the functionality of the network node 103 can be distributed over a plurality of physical entities connected to the communication network 102.

Also connected to the communication network 102 is a user terminal 104. The user terminal 104 can connect to the network node 103 over the communication network 102 and view videos streamed from the network node 103. The user terminal 104 can be a personal computer, mobile telephone, or other entity capable of receiving and display video streams from the network node 103. Note that many more user terminals can also connect to the communication network 102 and view videos streamed from the network node 103, but these are not shown in FIG. 1 for clarity.

Each of the mobile video capture devices 101 are capturing video of a portion of a common overall scene or event. For example, FIG. 1 illustrates a first portion 105 being captured by one of the mobile video capture devices 101, a second portion 106 being captured by another one of the mobile video capture devices 101, and a third portion 107 being captured by a yet further one of the mobile video capture devices 101. Each of the portions 105, 106 and 107 relate to the same scene or event, but are focused on a different part.

For example, at a concert, one of the mobile video capture devices 101 can be capturing video of a singer, whereas another is capturing video of a guitarist. In another example, the mobile video capture devices 101 can be capturing video of a wedding, and each of the mobile video capture devices is focused on different elements of the scene (e.g. one capturing the bride, another capturing the groom, and another capturing the wedding guests).

The mobile video capture devices 101 are only capturing a portion of the scene because limitations of the mobile video capture devices mean that only small field of view can be captured with an acceptable quality. Because the image sensors do not have a high resolution, capturing a wider field of view results in a smaller number of pixels capturing the main focal point of the video, thereby resulting in a lower quality.

The network node 103 is arranged to aggregate the portions 105, 106, 107 and generate, in real-time, a composite video which provides a panoramic video with a wider field of view at an acceptable quality, and stream the composite video over the communication network 102. The user terminal 104 can receive the composite video stream and display a composite video 108 showing a panoramic view of the event to a user in real-time (i.e. substantially contemporaneously with the live events occurring, barring technical delays caused by, for example, processing and transmitting the video data). A process for achieving this is described hereinafter.

Figure 2:
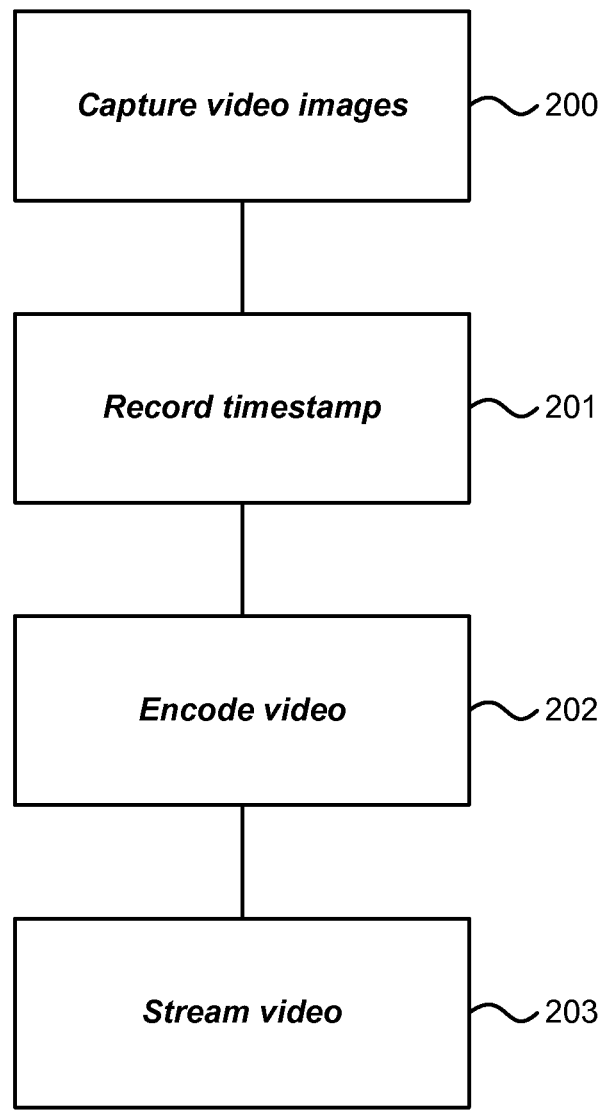
FIG. 2 shows a process for streaming video performed at a mobile video capture device.

Reference is now made to FIG. 2, which illustrates a process for streaming video which is performed at the mobile video capture devices 101. The video images (for example corresponding to portion 105, 106, or 107 in FIG. 1) are captured 200 as a sequence of frames (i.e. a plurality of still images which, when displayed in sequence, produce the video). A timestamp indicating the time of capture of each frame is recorded 201. The time of capture of each frame is provided by a clock running on each of the mobile video capture devices 101. In the case that a clock is not present in a mobile video capture device with a sufficient resolution, the number of elapsed CPU cycles can be counted. The clock in each of the mobile video capture devices 101 is synchronized to a time-source, for example a network time signal from a cellular network, a time signal from a global positioning system (GPS) receiver, or a time synchronization signal provided by the network node 103 or another node in the communication network 102. Therefore, each of the mobile video capture devices 101 has a clock which is synchronized with the clocks in each of the other mobile video capture devices 101.

The video images are then encoded 202. Any encoder suitable for producing encoded video for streaming can be used, for example H.263+ (also known as H.263v2). Preferably, the encoder is modified to also encode the timestamp along with each frame, such that the timestamps are embedded within the video stream data. In an alternative example, the timestamp information relating to the frames can be provided separately from the encoded video.

The encoded video is then streamed 203 from the mobile video capture device 101 to the network node 103 over the communications network 102. Any suitable protocol for streaming video can be used by the mobile video capture device 101, such as the real-time protocol (RTP).

In the following description a plurality of mobile video capture devices 101 are each performing the process shown in FIG. 1, and are capturing video of a common event or scene.

Figure 3:
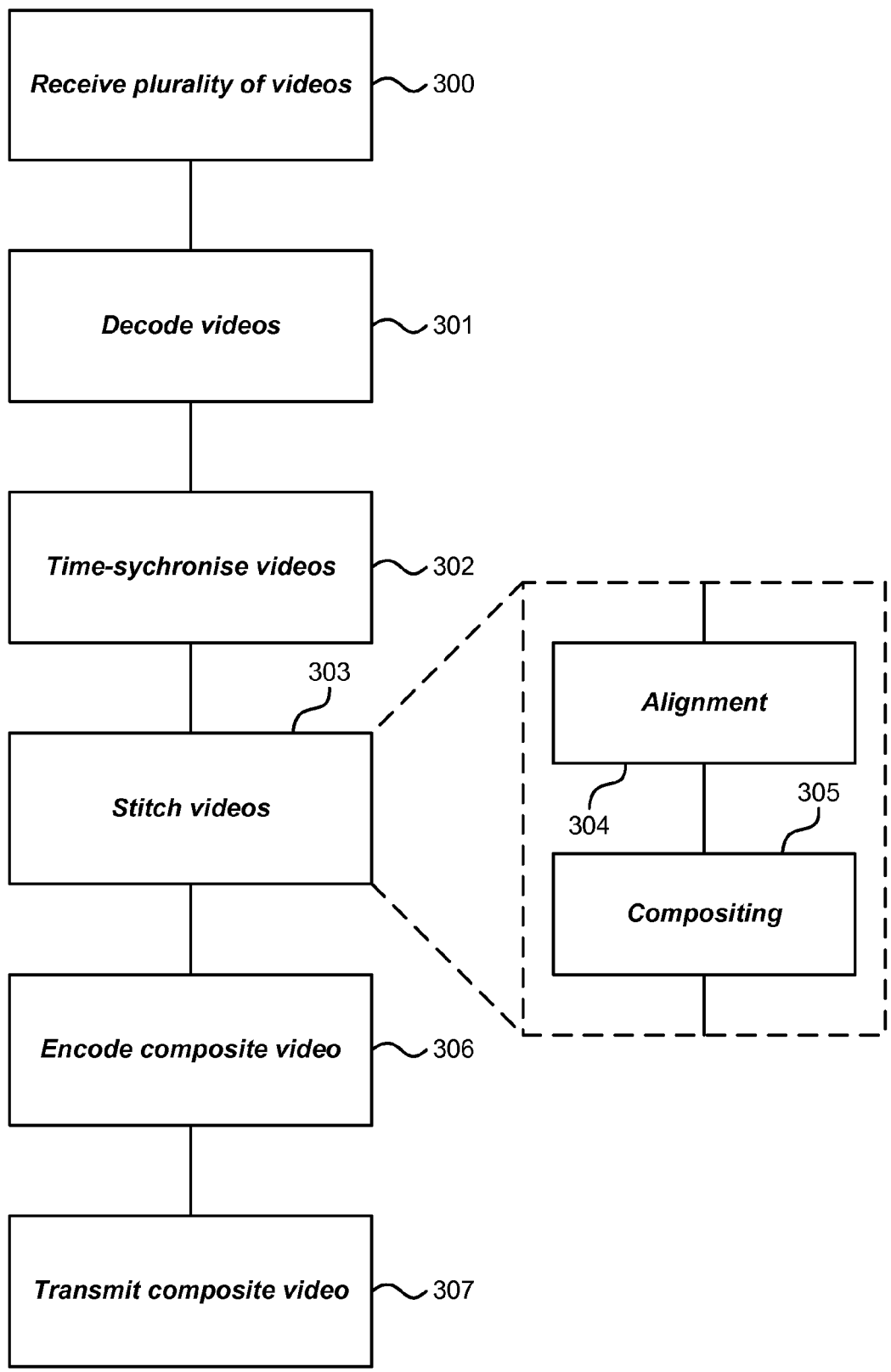
FIG. 3 shows a flowchart of a process for generating and transmitting a composite video sequence.
Figure 4:
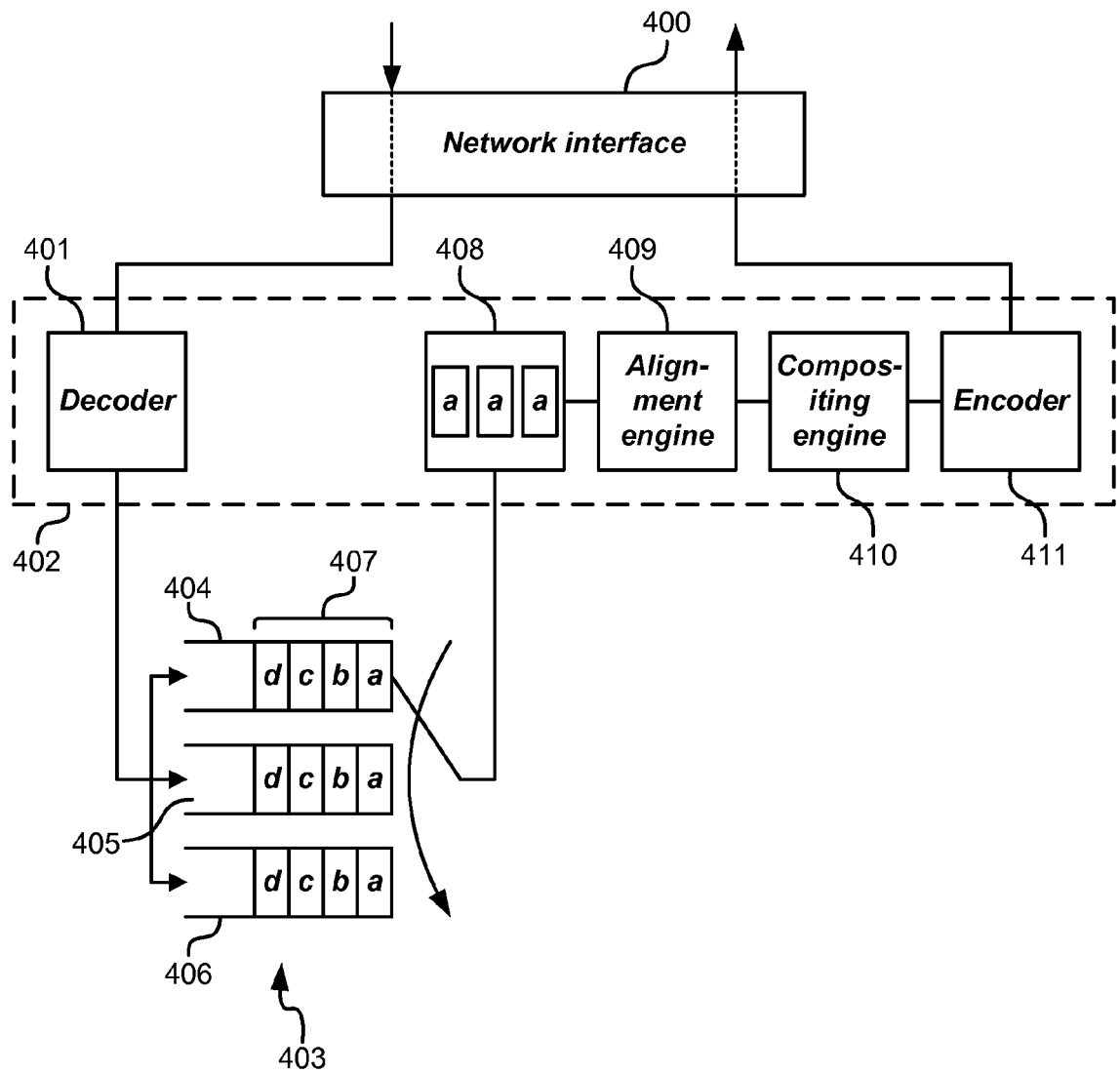
FIG. 4 shows a functional block diagram of a network node.

Reference is now made to FIG. 3, which illustrates a flowchart of a process for generating and transmitting a composite video sequence at the network node 103. Reference is also made to FIG. 4, which shows a functional block diagram for the network node 103. The network node 103 receives 300 a plurality of video streams from mobile video capture devices 101 which relate to a common event. The plurality of video streams are received at a network interface 400 at the network node 103, as shown in FIG. 4.

The network node 103 determines that each of the received plurality of video streams relate to a common event. This can be achieved in a number of ways. For example, each of the mobile video capture devices 101 can inform the network node 103 that they are capturing video of a specific event. This can be performed by the mobile video capture device 101 navigating to a web page provided by the network node 103 and entering an event, or selecting a predefined event from a list. The network node 103 then knows which mobile video capture devices are capturing video relating to which event. Alternatively, the mobile video capture devices 101 can be arranged to provide their location to the network node 103, for example as determined by a GPS sensor on the mobile video capture devices 101. The network node 103 can then determine whether a plurality of mobile video capture devices 101 are capturing video within a certain range of each other, and if so it can be deduced that the video streams from these mobile video capture devices 101 relate to the same event.

The network node 103 decodes 301 the plurality of videos with a decoder 401. The decoding can be performed on a processor 402 at the network node 103 (indicated generally by the dashed lines in FIG. 4), or alternatively using dedicated decoding hardware. Note that other functional blocks, such as a depacketizer, can also be included, but are not included in FIG. 4 for clarity. The decoder corresponds to the encoder used by the mobile video capture device, as outlined with reference to FIG. 2. As a result of the decoding, the frames from each of the plurality of video streams are obtained. In addition, the timestamps associated with the frames are also obtained.

The plurality of video streams are then time-synchronized 302. This is performed by queuing the frames from each video stream in a different one of a plurality of buffers 403 (i.e. a separate buffer queue for each of the mobile video capture devices 101). In the example shown in FIG. 1, three mobile video capture devices 101 were present, each sending a video stream, and therefore three buffers 404, 405 and 406 are shown in FIG. 4. Each of the plurality of buffers 403 queues decoded frames 407 from the associated video stream. The decoded frames 407 are queued in the buffers 403 according to the timestamp of the frame capture time.

In the example shown in FIG. 4, four frames from each of the video streams have been received and are queued in the buffers 403. The four frames are queued according to their timestamps, and in this case the four frames have timestamps "a", "b", "c" and "d". Because the clocks on each of the mobile video capture devices 101 are synchronized (as described above) the network node 103 knows that frames from different video streams having matching (to within a predefined range) timestamps were captured at substantially the same time instance. For example, timestamps within a millisecond of each other can be considered to be matching.

The processor 402 then selects a frame set 408 comprising a frame from each of the plurality of buffers 403, such that all of the selected frames have a matching timestamp. For example, as shown in FIG. 4, each of the three frames in the frame set 408 have timestamp "a".

The processor 402 at the network node 103 then attempts to stitch 303 the frames in the frame set 408 together, to form a composite frame. The stitching operation comprises two main parts: alignment 304 of the frames (as shown performed by an alignment engine 409 on the processor 402 in FIG. 4) and compositing 305 of the composite frame (as shown performed by a compositing engine 410 in FIG. 4).

Figure 5:
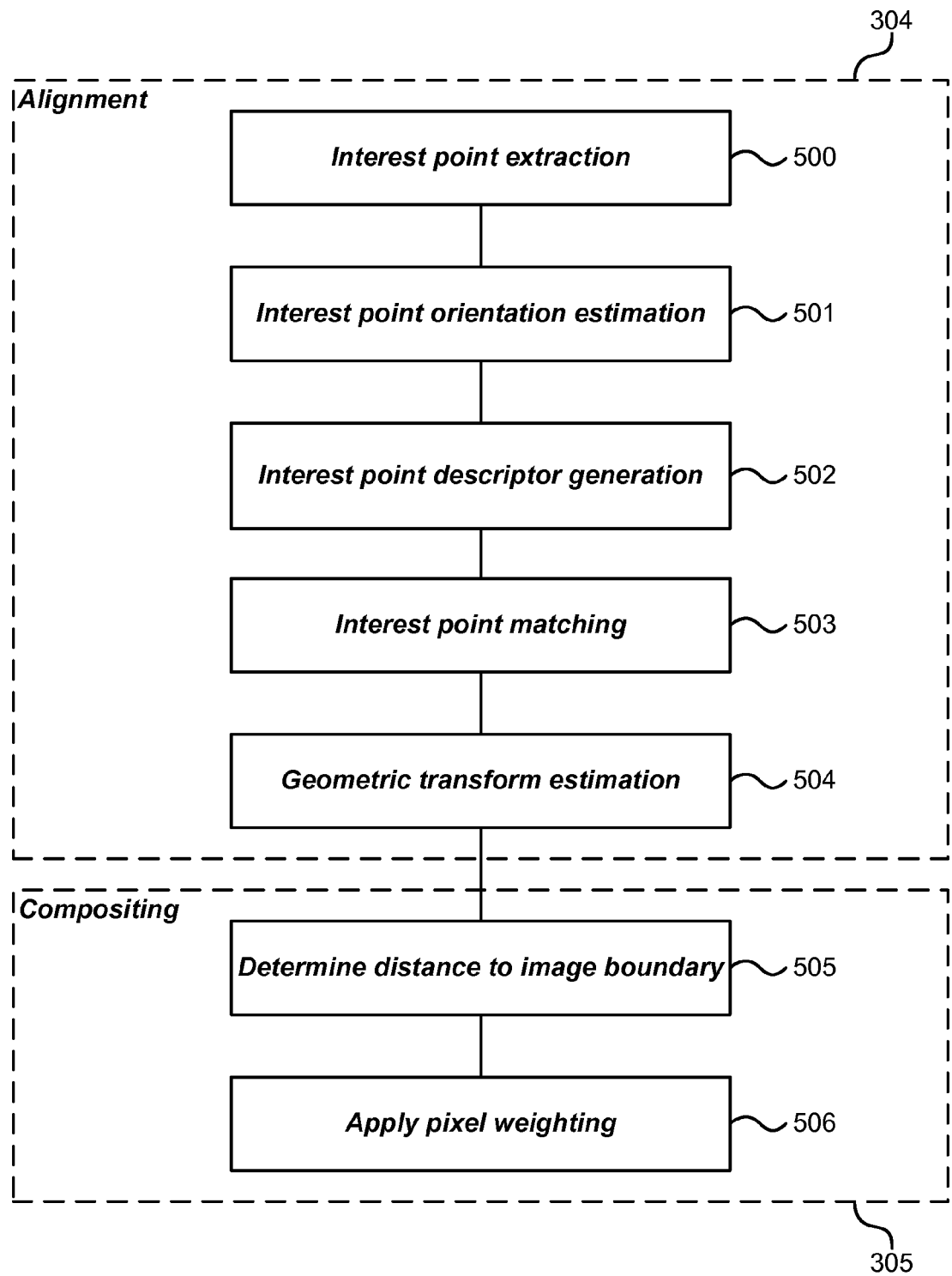
FIG. 5 shows a process for stitching a pair of frames.

Any suitable image stitching method for stitching the frames in the frame set 408 can be used, and an example operation is now described with reference to FIG. 5. The process in FIG. 5 is performed on a pair of frames. A process for stitching three or more frames (such as in FIG. 4) is described later with reference to FIG. 6.

The alignment 304 process starts with interest point (IP) extraction 500. For each frame in the frame set 408 a set of interest points are calculated. Interest points are characteristic points extracted in each frame and later used to match between frame pairs that can form a composite frame. An example interest point extractor is the Shi-Tomasi corner point detector, however other corner-like detectors can also be used.

Next, interest point orientation estimation 501 is performed for each extracted IP. This assigns a dominant orientation for each extracted IP. This operation is based on estimating the gradient direction for the IP.

An interest point descriptor is then generated 502. Each extracted IP is described using a local descriptor which is composed of the individual pixel values in a region (e.g. a rectangular region) around the IP location in the frame. In order to compensate for rotation between frame pairs forming a composite frame, the local descriptor is constructed using a rectangular region with one of the axes rotated by the IP orientation estimated previously.

Interest point matching 503 is then performed between a pair of frames. For a given frame pair (Frame1, Frame2) the purpose of the interest point matching is to determine whether the two frames can be aligned together. For example, if N interest points were extracted for Frame1 and M interest points extracted for Frame2, then the process attempts to match pairs of interest points from the N and M IPs. Firstly, the first IP of the N interest points of Frame1 is selected and a search is performed for the closest IP from the M interest points of Frame2. The closeness of the IP pair can, for example, be determined using the Euclidean distance between the corresponding descriptors of the IPs in the two frames (as generated in 502). The Euclidean distance is therefore used to indicate a likely match between a pair of IPs. If the Euclidean distance is beyond a threshold then the match candidate is discarded. The closest IP that is within the threshold is taken to be a matching IP. The next IP of the N interest points of Frame1 is then selected and a search is performed for the closest IP from the M interest points of Frame2, as above.

The result of the interest point matching 503 is a set of matching interest points between the pair of frames. If no matching interest points can be found, then the frames cannot be aligned and the process in FIG. 5 is stopped. If, however, at least a predetermined number, P, pairs of matching interest points is found, then the process continues with a geometric transform estimation 504.

If there are D matching IP pairs between the two frames, then the purpose of the geometric transform estimation is to estimate a geometric transform to apply to the pixels of one frame to align the D matching interest points with the other frame in the pair of frames. Several possible transformation types can be applied such as translational, translational & rotational, affine and perspective. The transformation type used can depend on the application or the subject of the video streams. For example, in an indoor setting a rotational & translation transform can be sufficient, while in a soccer match a full perspective transform can be appropriate.

The parameters for applying the transform are then determined. This can be performed by using a least squares approach, such that the matching IP pairs are compared between the pair of frames for different transformation parameters, and the sum of the squared differences is minimized. This approach reduces noise effects. In some examples, the transform can be estimated on multiple selected random samples of the matching IP pairs (known as a RANdom SAmple Consensus (RANSAC) procedure).

Once the geometric transform parameters have been estimated, then the geometric transform can be applied to one of the pair of frames, such that it is aligned with the other frame. The compositing 305 process then starts. The purpose of the compositing process is to compose the final panoramic composite frame out of the individual aligned frames.

A flat compositing surface can be used, such that one frame is selected as the reference frame, and the other frames are added to this frame. This provides a high-speed composition with acceptable quality. In alternative examples, other compositing surfaces can be used, such as a cylindrical or spherical projection, which can reduce distortions for wide fields of view.

There are two main parts to the compositing process: determining distance values 505 for each pixel in the overlap area of the two frames, and applying a pixel weighting 506 in the overlap area based on the distance values. For a given pair of frames that are deemed stitchable, there exists a region of overlap where pixel values can come from either frame. The compositing process selects the pixel value for every pixel in the overlap area. The compositing technique in this example uses feathering based on pixel weighting.

Firstly, the distance values 505 are found for each pixel in the overlap area. This comprises a determination of the distance from each pixel in the overlap area to each of the two frame boundaries.

Secondly, the pixel weighting 506 selects a pixel value for every pixel in the overlap area based on a weighted average of pixel values from the two input frames. The per-pixel weighting used in the weighted average is based on the distance values indicating the location of the pixel (relative to the two frame boundaries) in each of the two frames. In other words, the weighting applied in the weighted average depends upon the pixel's distance from the boundary of each frame, such that pixels further from the boundary are given a higher weighting.

Other composition techniques such as block-based compositing or gradient domain stitching can also be used. However, feathering generally yields acceptable composition quality and can compensate for exposure differences. Furthermore, since the input frames are already time synchronized, there is no risk of ghosting. Feathering is also sufficiently computationally inexpensive to be performed in real-time.

Once the stitching operation is complete, the result is a single composite frame made up of the frames in the frame set 408. The frames in the frame set 408 have been stitched together such that, from the perspective of a user, the joins between the frames are not readily visible.

Figure 6:
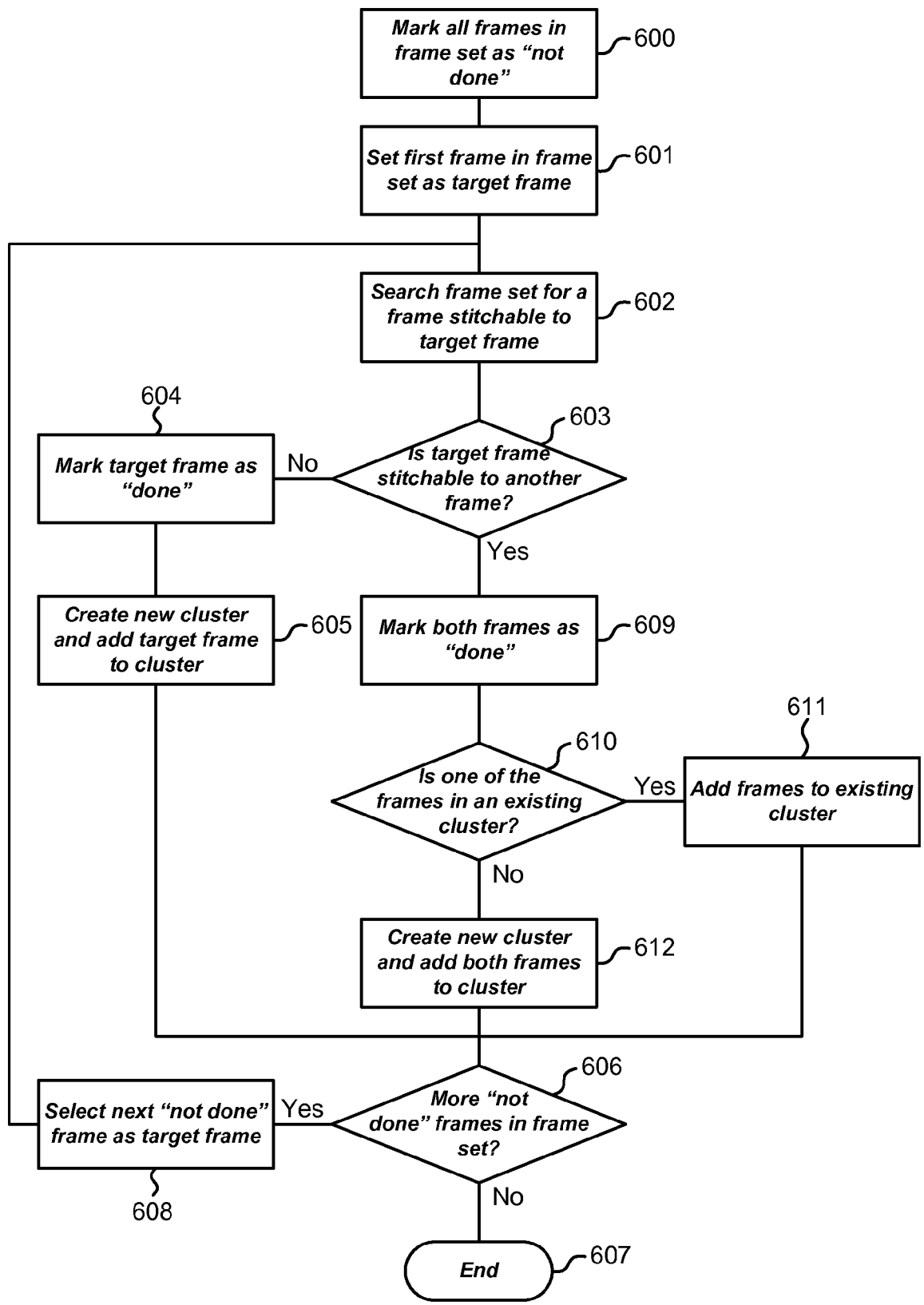
FIG. 6 shows a process for stitching three or more frames.

As stated above, the process described with reference to FIG. 5 applies for stitching a pair of frames. If, however, three or more frames are to be stitched together, then a process such as that shown in FIG. 6 is performed. The process in FIG. 6 clusters the frames in the frame set 408, such that frames that can be stitched together are placed in the same cluster. The cluster with the most frames is selected to form the composite frame. In addition, the clusters can be maintained and the spatial stitching order reused, rather than being recalculated from scratch at every frame.

Firstly, all of the frames in the frame set 408 are initialized 600 such that they are flagged as "not done", i.e. that they have not yet been processed. The first frame in the frame set 408 is then selected 601 as the "target" frame, i.e. the frame which is being processed first. A search 602 is performed for other frames in the frame set 408 that are able to be stitched to the target frame (i.e. the first frame at this stage). The search 602 can be arranged to stop as soon as another stitchable frame is found in the frame set, to ensure fast performance. Alternatively, the best matching frame from all the other frames in the frame set 408 can be found.

The search process can comprise the operations of extraction 500, orientation estimation 501, descriptor generation 502 and matching 503 as described above with reference to FIG. 5. Note that, in an alternative example, the extraction 500, orientation estimation 501 and descriptor generation 502 operations can be performed for all frames in the frame set 408 in advance of the process of FIG. 6. The result of the interest point matching operation 503 is a decision as to whether two frames can be stitched together.

If it is determined 603 that the target frame is not stitchable to another frame in the frame set 408, then the target frame is flagged 604 as "done" (i.e. processed) and a new cluster is created 605 and the target frame allocated to this cluster. This cluster will only contain the target frame, as it is not stitchable to any other frames.

If it is determined 603 that the target frame is stitchable to another frame in the frame set 408, then the target frame and the frame to which it is stitchable are both flagged 609 as "done". It is then determined 610 whether one of these two frames is already allocated to a cluster. If so, then the target frame and the frame to which it is stitchable are allocated 611 to this cluster. If not, then a new cluster is created 612, and the target frame and the frame to which it is stitchable are allocated to the new cluster.

It is then determined 606 whether more frames are present in the frame set 408 that are flagged "not done". If not, then the process in FIG. 6 is ended 607. If so, then the next "not done" frame in the frame set is selected 608 to be the target frame, and the search process above is repeated.

Therefore, as a result of the process in FIG. 6, each of the frames in the frame set 408 are allocated to a cluster. Frames which cannot be stitched together are allocated to their own cluster. Conversely, a set of frames that can be stitched together are allocated to the same cluster. The clustering process above has a time complexity $O(N^2)$ in the worst case, where N is the number of incoming video streams.

Once the clustering process of FIG. 6 has been performed, then the cluster having the largest number of frames can be selected to form the composite frame. If several clusters have the same number of frames, then a random selection can be performed. Each of the frames allocated to the selected cluster can then be stitched to form the composite frame as per the stitching process in FIG. 5 (i.e. using the remaining steps of alignment and compositing). Note that, in alternative examples, the stitching can also be performed during the clustering process. For example, a pair of frames can be stitched as soon as they have been found by the search 602.

Preferably, the clustering of stitchable pairs of frames happens only in the first frame of each video. Starting from the second frame, the ordering information obtained from analyzing the first frame is utilized, and the process only ensures that the previously stitched frames are still stitchable. In case of failure of the stitching order obtained from previous frames, the ordering process would start from scratch, as in FIG. 6.

Returning again to FIGS. 3 and 4, once the operations to stitch 303 the frames in the frame set 408 (using the processes in FIGS. 5 and 6, as appropriate) are complete, then the resulting composite frame is added to a composite video sequence. The composite frames for the composite video sequence can be buffered. The composite video sequence comprising the composite frames is then encoded 306 using an encoder 411 (which can be implemented in the processor 402 or as dedicated hardware). The encoded composite video sequence can then be transmitted 307 from the network interface 400, over the communication network using a protocol such as RTP, and can be viewed by one or more user terminals (such as the user terminal 104).

The processes described above therefore enable a composite video sequence to be generated from a plurality of video streams provided by mobile video capture devices 101. The use of mobile video capture devices 101 introduces a number of complexities that are overcome with the above described techniques. Because the mobile video capture devices 101 are independent devices (e.g. mobile phones) streaming data to 103 network node, the corresponding frames from each of the mobile video capture devices 101 do not necessarily arrive at the network node 103 at the same time. For example, the video streams sent by the mobile video capture devices 101 can also arrive at the network node 103 via different routes (e.g. some via one or more cellular networks, some via wireless LAN connections). Each of these routes can have different delays, meaning that frames corresponding to the same time-instance from the different mobile video capture devices 101 can arrive at different times at the network node 103. Furthermore, the mobile video capture devices 101 can have different processing capabilities, resulting in different processing and encoding delays in the frames being sent from the mobile video capture devices 101.

However, because the mobile video capture devices 101 are synchronized such that they each have a synchronized clock, and record a timestamp for each frame (which is preferably encoded with the frame in the video stream), the network node 103 is able to buffer the frames and ensure that they are selected such that they correspond to the same capture time.

The above-described stitching process also enables the network node to stitch together frames from the mobile video capture devices 101 even though they are movable, and are not capturing the video from pre-known angles or distances. The use of geometric transforms enables the frames to be stitched together for a wide variation of relative capture positions between the mobile video capture devices 101.

The above-described process can be performed in real-time, such that the composite video sequence is generated on-the-fly as frames from the plurality of mobile video capture devices 101 are received. This enables a user of the user terminal 104 to view the composite video sequence of a live event substantially contemporaneously with the event occurring.

The speed of generation of the composite video sequence can be further increased by determining whether the alignment 304 process can be skipped for some frames, and previously calculated alignment parameters used. For example, if the mobile video capture devices 101 are not moving significantly, then the alignment parameters to stitch together the frames from the mobile video capture devices 101 remains substantially constant.

The network node 103 can monitor the movement of the mobile video capture devices (i.e. determine whether the overall frame is changing, not just a subject within the frame) and if it determines that the mobile video capture devices 101 are moving less than a threshold amount then the alignment parameters are not calculated for every frame, but only once in a predefined number of frames (e.g. every L frames). If however, it is determined that the mobile video capture devices 101 are moving more than the threshold amount then the alignment parameters are calculated for every frame.

Alternatively, the value for L can be dynamically calculated, such that if the mobile video capture devices 101 are motionless, then a high value of L is used, and as the mobile video capture devices 101 move more the value of L is increased until the mobile video capture devices are moving sufficiently that the alignment parameters are calculated for every frame.

Figure 7:
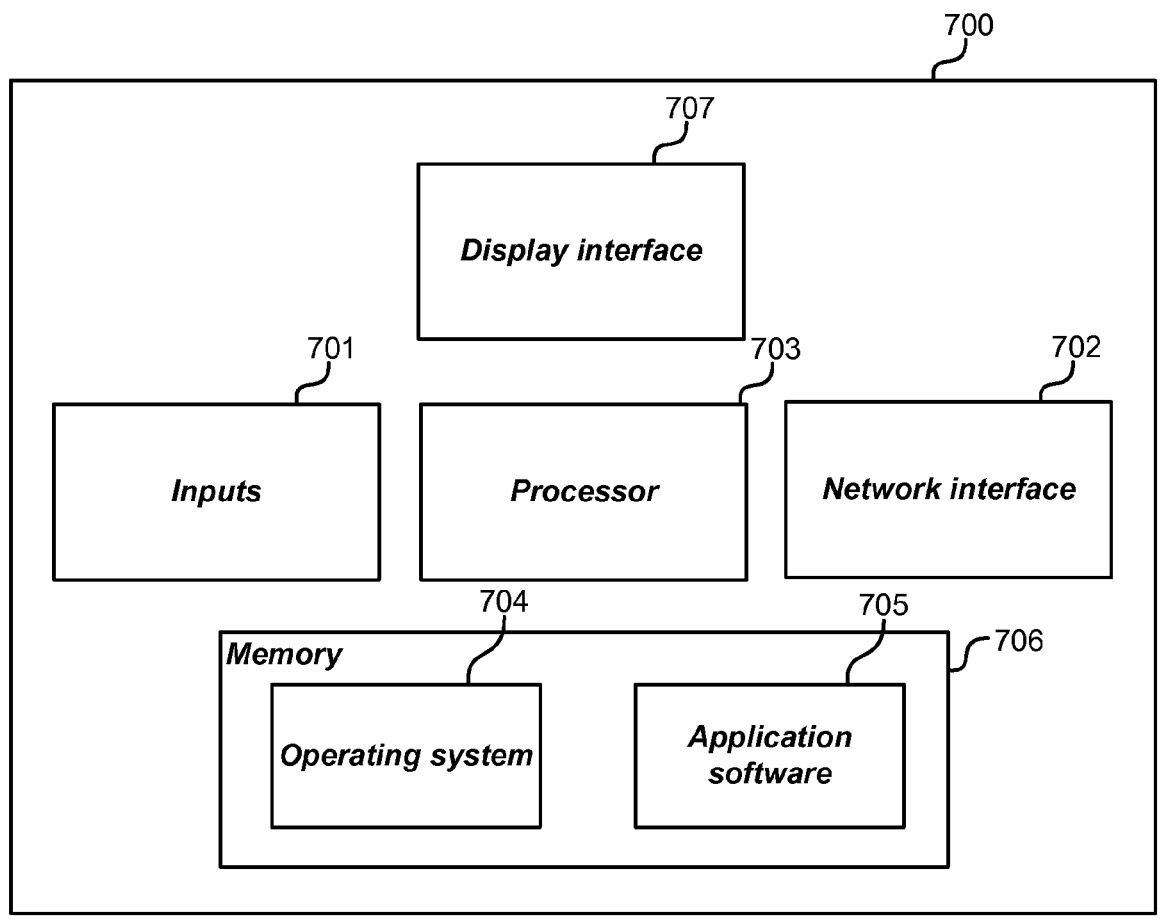
FIG. 7 shows an exemplary computing-based device in which embodiments of a node for composite video generation can be implemented.

FIG. 7 illustrates various components of an exemplary computing-based device 700 which can be implemented as any form of a computing and/or electronic device, and in which embodiments of a node for composite video sequence generation can be implemented.

The computing-based device 700 comprises one or more inputs 701 which are of any suitable type for receiving media content, Internet Protocol (IP) input, video streams, audio streams or other input. The device also comprises network interface 702, to enable it to communicate over a communication network with, for example, user terminals.

Computing-based device 700 also comprises one or more processors 703 which can be microprocessors, controllers or any other suitable type of processors for processing computing executable instructions to control the operation of the device in order to generate composite video. Platform software comprising an operating system 704 or any other suitable platform software can be provided at the computing-based device to enable application software 705 to be executed on the device.

The computer executable instructions can be provided using any computer-readable media, such as memory 706. The memory is of any suitable type such as random access memory (RAM), a disk storage device of any type such as a magnetic or optical storage device, a hard disk drive, or a CD, DVD or other disc drive. Flash memory, EPROM or EEPROM can also be used.

An output 707 is also provided such as an audio and/or video output to a display system integral with or in communication with the computing-based device. The display system can provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of generating a composite video sequence at a node in a communications network comprising a plurality of mobile video capture devices, the method comprising:

receiving a plurality of video streams relating to a common event, each of the video streams comprising a sequence of frames and originating from a different one of the mobile video capture devices;

time-synchronizing the video streams and selecting a frame set comprising a frame from each of at least two of the video streams, each frame in the frame set having a common capture time;

forming a composite frame by stitching at least two frames in the frame set together, the stitching including:
  identifying previous alignment parameters used to align frames in a previous frame set;
  determining whether the previous alignment parameters can be utilized;
  when the previous alignment parameters can be utilized, geometrically aligning the at least two frames in the frame set according to the previous alignment parameters; and
  when the previous alignment parameters cannot be utilized:
    calculating new alignment parameters, calculating new alignment parameters including:
      extracting a plurality of interest points from the at least two frames;
      determining a plurality of orientations corresponding to the plurality of interest points;
      determining a plurality of descriptors corresponding to the plurality of interest points using the plurality of orientations;
      matching a first interest point of a first frame of the at least two frames to a second interest point of a second frame of the at least two frames using at least two of the plurality of descriptors; and
      determining a transform, the transform geometrically aligning the first frame and the second frame; and
    geometrically aligning the at least two frames in the frame set according to the new alignment parameters; and
  adding the composite frame to the composite video sequence.

2. A method according to claim 1, further comprising encoding the composite video sequence and streaming the encoded composite video sequence to a user terminal over the communications network.

3. A method according to claim 1, wherein the video streams are of a live event and wherein the method is carried out in real-time.

4. A method according to claim 1, wherein each frame comprises a timestamp recording the capture time of the frame, and the time-synchronizing comprises reading the timestamp and queuing the frames from each video stream according to the capture time.

5. A method according to claim 4, wherein each of the plurality of video streams is encoded such that each video stream comprises the timestamp for each frame.

6. A method according to claim 4, wherein the queuing comprises buffering the frames from each video stream in one of a plurality of buffers.

7. A method according to claim 1, wherein determining whether the previous alignment parameters can be utilized comprises determining whether the previous alignment parameters were calculated within a predetermined time interval.

8. A method according to claim 1, wherein determining whether the previous alignment parameters can be utilized comprises determining whether at least one of the mobile video capture devices is moving more than a threshold movement level.

9. A method according to claim 1, further comprising determining that the plurality of video streams relate to a common event.

10. A method according to claim 1, further comprising decoding each of the plurality of video streams prior to time-synchronizing the video streams.

11. A method according to claim 1, wherein the plurality of mobile video capture devices comprises three or more mobile video capture devices, and the step of forming a composite frame comprises:
  searching the frame set for frames that are able to be stitched together;
  allocating each frame in the frame set to one of a plurality of clusters, such that frames that are able to be stitched together are allocated to the same cluster, at least two clusters each being allocated at least one frame;
  selecting from the plurality of clusters a cluster comprising the largest number of allocated frames; and
  stitching the frames in the selected cluster to form the composite frame.

12. A method according to claim 1, further comprising transmitting a time synchronization signal to each of the mobile video capture devices over the communication network.

13. A network node for generating a composite video sequence, comprising:
  a network interface arranged to:
    connect to a communications network;
    receive a plurality of video streams, each of the video streams comprising a sequence of frames and originating from a different one of a plurality of mobile video capture devices; and
    determine that each of the plurality of video streams is related to a common event;
  a plurality of buffers, each arranged to queue the sequence of frames from one of the video streams according to a frame capture time;
  a processor arranged to select a frame set comprising a frame from each of the plurality of buffers, each frame having a common capture time;
  an alignment engine configured to stitch at least part of each frame in the frame set together to form a composite frame, the alignment engine being further configured to:
    form the composite frame by stitching at least two frames in the frame set together, the stitching including:
      identifying previous alignment parameters used to align frames in a previous frame set;
      determining whether the previous alignment parameters can be utilized;
      when the previous alignment parameters can be utilized, geometrically aligning the at least two frames in the frame set according to the previous alignment parameters; and
      when the previous alignment parameters cannot be utilized:
        calculating new alignment parameters, calculating new alignment parameters including:
          extracting a plurality of interest points from the at least two frames;
          determining a plurality of orientations corresponding to the plurality of interest points;

determining a plurality of descriptors corresponding to the plurality of interest points using the plurality of orientations;

matching a first interest point of a first frame of the at least two frames to a second interest point of a second frame of the at least two frames using at least two of the plurality of descriptors; and determining a transform, the transform geometrically aligning the first frame and the second frame; and a compositing engine configured to add the composite frame to a composite video sequence and transmit the composite video sequence from the network interface to a user terminal connected to the communications network.

14. A network node according to claim 13, wherein the network interface receives a plurality of video streams originating from a different one of a plurality of mobile telephones.

15. A computer-implemented method of generating a composite video sequence at a node in a communications network comprising three or more mobile video capture devices, the method comprising:

receiving a plurality of video streams relating to a common event, each of the video streams comprising a sequence of frames and originating from a different one of the mobile video capture devices;

time-synchronizing the video streams and selecting a frame set comprising a frame from each of at least two of the video streams, each frame having a common capture time;

forming a composite frame by:
searching the frame set for frames that are able to be stitched together;
allocating each frame in the frame set to one of a plurality of clusters, such that frames that are able to be stitched together are allocated to the same cluster;
selecting from the plurality of clusters a cluster comprising the largest number of allocated frames; and
stitching the frames in the selected cluster to form the composite frame, stitching including:
identifying previous alignment parameters used to align frames in a previous frame set;
determining whether the previous alignment parameters can be utilized;
when the previous alignment parameters can be utilized, geometrically aligning at least two frames in the frame set according to the previous alignment parameters; and
when the previous alignment parameters cannot be utilized:
calculating new alignment parameters, calculating new alignment parameters including:
extracting a plurality of interest points from the at least two frames;
determining a plurality of orientations corresponding to the plurality of interest points;
determining a plurality of descriptors corresponding to the plurality of interest points using the plurality of orientations;
matching a first interest point of a first frame of the at least two frames to a second interest point of a second frame of the at least two frames using at least two of the plurality of descriptors; and
determining a transform, the transform geometrically aligning the first frame and the second frame; and adding the composite frame to the composite video sequence.

16. A method according to claim 9, wherein determining that the plurality of video streams relate to a common event comprises receiving a notification from each of the plurality of mobile video capture devices indicating the event.

17. A method according to claim 9, wherein determining that the plurality of video streams relate to a common event comprises determining that each of the plurality of mobile video capture devices navigated to a web page provided by the network node and entered or selected the event through the web page.

18. A method according to claim 9, wherein determining that the plurality of video streams relate to a common event comprises:

receiving from each of the plurality of mobile video capture devices, an indication of the mobile video capture device's current location; and determining, based on the current location of each mobile video capture device, that each of the plurality of mobile video capture devices are within a predefined range of each other.

19. A method according to claim 13, wherein determining that the plurality of video streams relate to a common event comprises receiving a notification from each of the plurality of mobile video capture devices indicating the event.

20. A method according to claim 13, wherein determining that the plurality of video streams relate to a common event comprises:

receiving from each of the plurality of mobile video capture devices, an indication of the mobile video capture device's current location; and determining, based on the current location of each mobile video capture device, that each of the plurality of mobile video capture devices are within a predefined range of each other.

* * * * *